B. R. HUNTER.
LUBRICATOR.
APPLICATION FILED SEPT. 1, 1908.
917,608.
Patented Apr. 6, 1909.
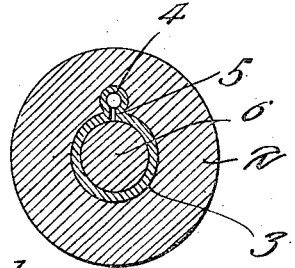
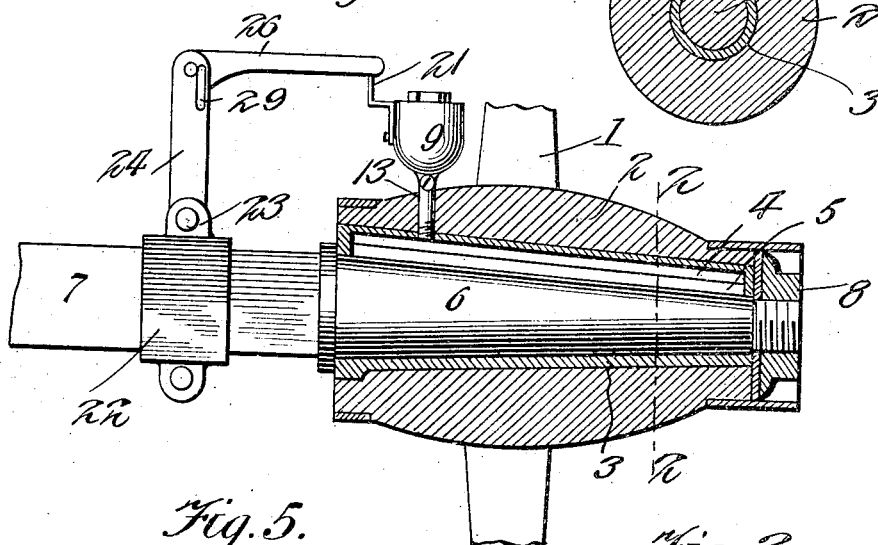
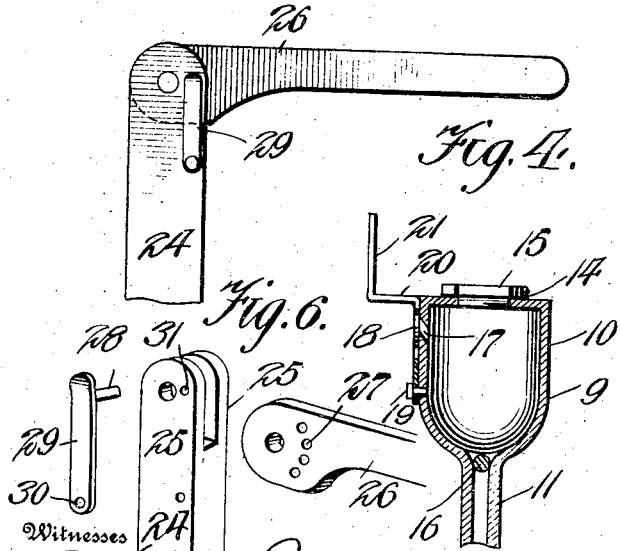
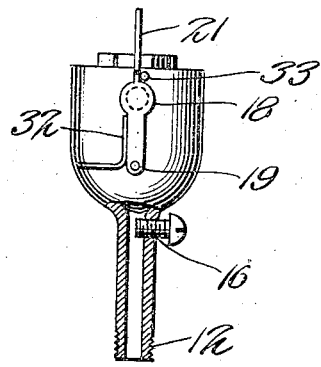
Inventor
Baxter R. Hunter
By Victor J. Evans
Attorney
Witnesses

UNITED STATES PATENT OFFICE.

BAXTER R. HUNTER, OF KINGS MOUNTAIN, NORTH CAROLINA.

LUBRICATOR.

No. 917,608.  Specification of Letters Patent.  Patented April 6, 1909.

Application filed September 1, 1908. Serial No. 451,209.

*To all whom it may concern:*

Be it known that I, BAXTER R. HUNTER, a citizen of the United States, residing at Kings Mountain, in the county of Cleveland and State of North Carolina, have invented new and useful Improvements in Lubricators, of which the following is a specification.

The invention relates to an improvement in oiling devices and is particularly directed to a construction whereby a vehicle wheel may be automatically and continuously oiled during the travel of the vehicle.

The main object of the present invention is the provision of an oiling device adapted to be applied to the hub of a vehicle wheel and normally prevented from delivering oil to the spindle, the construction including a manually adjustable arm adapted on each revolution of the wheel to so operate the oiling device as to permit the delivery therefrom of a predetermined quantity of oil to the spindle.

The invention will be described in the following specification, reference being had particularly to the accompanying drawings, in which:—

Figure 1 is a view in section, partly in elevation of a wheel hub and axle showing the application thereto of my improved oiling device. Fig. 2 is a section on line 2—2 of Fig. 1. Fig. 3 is an elevation partly in section of the oiling device. Fig. 4 is a vertical section of the oiling device. Fig. 5 is an elevation of the trip lever and support. Fig. 6 is a perspective view, partly broken away, showing parts of the trip lever and support.

Referring particularly to the accompanying drawings, my improved oiling device is designed for use in connection with a vehicle wheel 1, the hub 2 of which is provided with a boxing 3 which is of usual construction except that it is formed with a relatively offset cylindrical chamber 4 in communication with the interior of the boxing through a restricted opening 5. The wall forming the chamber 4 is set into the material of the hub, and said chamber, which extends practically throughout the length of the boxing, may be hereinafter termed the oil chamber. The boxing is designed to fit a spindle 6 carried by the axle 7 in the usual manner, any suitable securing means, as 8, serving to secure the wheel in place. An oil cup 9 is arranged to deliver the lubricant to the oil chamber 4, said cup comprising a hollow cylindrical body 10 and a depending hollow stem 11 in communication with the body. The relatively lower end of the stem is threaded, as at 12, and said stem is arranged to be inserted through an opening 13 formed in the hub, the threaded end of the stem engaging a threaded opening in the wall of the oil chamber 4. The body 10 is formed in the top with a filling opening 14 normally closed by a cap 15, and the stem adjacent its juncture with the body is provided with a screw bolt 16 arranged for movement transverse the opening in the stem whereby to adjust the size of said opening and thereby the flow of oil through the same.

The side wall of the body, adjacent the top thereof, is provided with an air inlet opening 17, the plane of which is preferably at an angle to the axis of the body to prevent the escape of the oil in the operation of the device. The air vent is normally closed by a valve plate 18, which is pivotally mounted at its lower end, as at 19, on the body and formed at its upper end with a disk head of a size to cover the air vent when the plate is in one position. Projecting outwardly from the disk head of the valve plate relatively to the cup is an angle arm 20, the upper portion of which projects in parallel relation to the axis of the oil cup and terminates above the top of the cup, providing what will be hereinafter termed a trip arm 21. A clamp 22 is secured upon the axle adjacent the spindle and is provided with ears 23 between which is pivotally mounted an upright 24. The upright is preferably divided longitudinally for a portion of its length to provide spaced sections 25 between which at the upper end is pivotally mounted a lever 26, hereinafter termed the trip lever. In the lever adjacent its pivotal connection is formed a series of openings 27, arranged in a circle concentric with the pivot and adapted to be engaged at will by a pin 28 projecting from a spring arm 29, which at one end, as 30, is secured to the upright, the pin passing through an opening 31 in one of the sections 25 and being adapted to engage any one of the openings 27. By this construction the lever 26, may be set at any desired angular relation to the upright 24, for a purpose which will presently appear.

It is to be understood that the clamp is so arranged on the axle that when the trip lever 26 is in normal position, that is at right angles to the support, the outer or free end of said lever will, in the travel of the vehicle, engage the trip arm 21 of the valve plate at each successive revolution of the wheel. This movement will vent the oil cup and permit a quantity of oil, regulated by the bolt 16, to pass to the oil chamber 4 and from the latter to the spindle. The valve plate is spring pressed in a direction opposite that in which it is moved by the trip lever by a leaf spring 32, secured to the body 10, and a stop pin 33 projects from the body in position to engage the valve plate when moved under the influence of the spring 32 to accurately dispose said plate in position to close the vent opening 17.

It is, of course, understood that as long as the vent opening is closed no oil will flow from the oil cup, but when said opening is exposed by operating the valve plate, the oil will flow from the cup as long as air is admitted to the body. Therefore, at each revolution of the vehicle wheel the trip arm will act to operate the valve plate and thereby vent the oil cup, thus delivering to the spindle a definite quantity of oil at each revolution of the wheel.

By the adjustment described for the lever 26 the duration of operative effect of said lever may be controlled as desired, as will be apparent. When it is not desired to automatically deliver the oil to the wheel the operator can simply release the trip lever from the holding means and turn it to the rearward position to or away from the valve cup.

The improved construction provides a simple device which with the parts in operative position will act to automatically lubricate a vehicle wheel without requiring any attention on the part of the operator, such lubrication continuing as long as oil remains in the cup.

Having thus described the invention what is claimed as new, is:—

1. An oiling device for use with vehicles, including a wheel and an axle, said device comprising an oil cup mounted on and movable with the vehicle wheel, means for normally closing said cup against the passage of oil therefrom, and means carried by the axle for engaging and operating the closing means to permit the delivery of oil from said cup.

2. An oiling device for use with vehicles, including a wheel and an axle, said device comprising an oil cup mounted on and movable with the vehicle wheel, an air vent in said cup, means for normally closing said vent, and means carried by the axle to engage the closing means to vent the cup at predetermined intervals.

3. An oiling device for use with vehicles, including a wheel and an axle, said device comprising an oil cup formed with an air vent, a valve plate normally closing the vent, and means carried by the axle to operate the plate to open the vent.

4. The combination with an axle, a wheel mounted thereon, and a boxing in the wheel and formed with an oil chamber, of an oil cup in communication with the chamber, said cup being formed with an air vent, a valve plate normally closing said vent, and means carried by the axle to engage and operate the plate.

5. The combination with an axle, a wheel mounted thereon, and a boxing in the wheel and formed with an oil chamber, of an oil cup in communication with the chamber, said cup being formed with an air vent, a valve plate normally closing said vent, means carried by the axle to engage and operate the plate, and means for returning the plate to normal position.

6. The combination with an axle, a wheel mounted thereon, and a boxing in the wheel and formed with an oil chamber, of an oil cup in communication with the chamber, said cup being formed with an air vent, a valve plate normally closing said vent, and a trip lever carried by the axle to engage and operate the valve plate.

7. The combination with an axle, a wheel mounted thereon, and a boxing in the wheel and formed with an oil chamber, of an oil cup in communication with the chamber, said cup being formed with an air vent, a valve plate normally closing said vent, a trip lever carried by the axle to engage and operate the valve plate, and means for adjusting the lever.

8. The combination with an axle, a wheel mounted thereon, and a box formed with an oil chamber, of a valve cup including a body and a stem in communication with the body, said stem being arranged to extend through the wheel hub and engage the box to provide open communication between the stem and oil chamber, a screw bolt threaded in the stem to regulate the quantity of oil passing therethrough, said body being formed with an air vent, a valve plate pivotally mounted on the body and normally closing the vent, a trip arm connected to the plate and extending above the body, a support fixed to the axle, and a trip lever mounted in the support and adapted to engage the trip arm to operate the valve plate.

9. The combination with an axle, a wheel mounted thereon, and a box formed with an oil chamber, of a valve cup including a body and a stem in communication with the body, said stem being arranged to extend through the wheel hub and engage the box to provide open communication between the stem and oil chamber, a screw bolt threaded in the stem to regulate the quantity of oil passing therethrough, said body being formed with an air vent, a valve plate pivotally mounted on the body and normally closing the vent, a trip arm connected to the plate and extending above the body, a support fixed to the axle, a trip lever mounted in the support and adapted to engage the trip arm to operate the valve plate, a spring for operating the valve plate in a direction opposing that induced by the lever, and a stop for limiting the movement of the plate under the influence of the spring.

In testimony whereof I affix my signature in presence of two witnesses.

BAXTER R. HUNTER.

Witnesses:
HORATIO T. FULTON,
EDWIN W. BARNES.